United States Patent [19]

Birkett

[11] 4,445,773
[45] May 1, 1984

[54] EXPOSURE INDICATOR

[76] Inventor: William B. Birkett, 42227 Sunnydale La., Northville, Mich. 48167

[21] Appl. No.: 428,265

[22] Filed: Sep. 29, 1982

[51] Int. Cl.³ .......................... G03B 27/74; G01J 1/42
[52] U.S. Cl. ........................................ 355/68; 355/83; 250/214 R
[58] Field of Search .................................. 355/67–70, 355/83; 356/226; 330/59; 307/311, 494; 250/214, 551

[56] References Cited

U.S. PATENT DOCUMENTS 4,111,549  5/1978  Cazel et al. ............................ 355/68
4,286,171  8/1981  Hara et al. ........................... 250/551

*Primary Examiner*—L. T. Hix
*Assistant Examiner*—D. Rutledge

*Attorney, Agent, or Firm*—Bean, Kauffman & Bean

[57] ABSTRACT

An exposure indicator for photographic plate makers including a comparator having a control input, an inverting input and an output; a light emitting diode having its anode connected to the control input for developing a reverse bias signal at said control input in response to illumination from the plate maker light source whereby an output comparator signal is generated when the control input signal exceeds a reference signal at the comparator's inverting input; the output signal forward biasing the light emitting diode to its light emitting state and also fed back to the control input to maintain the light emitting diode in such emitting state; and vacuum operated switch means to provide power to the indicator circuit in response to vacuum actuation of the plate maker flexible blanket.

6 Claims, 2 Drawing Figures

4,445,773

EXPOSURE INDICATOR

BACKGROUND OF THE INVENTION

The present invention relates to exposure indicators or monitors and, more particularly, to an exposure indicating electronic circuit for use in conjunction with photographic plate or film making equipment and the like.

Double exposures and wasted film therefrom because of distractions and the like tending to make the operator forget the fact that a particular plate has already been exposed has been a longstanding problem in the plate making art.

One solution to this problem is evidenced by the circuit in prior U.S. Pat. No. 4,111,549 wherein there is disclosed an exposure indicator which is attached to the hinged glass mask or contact frame of a plate making apparatus and includes a light emitting diode and a light sensitive SCR. When illuminated by the plate maker light source, the SCR resistance drops thereby causing the light emitting diode to glow; indicating that an exposure has taken place. According to this prior patent, the SCR and light emitting diode circuit is placed in readiness for operation by means of a switch responsive to movement of the glass frame into contact with the film to be exposed, which is intimately sandwiched between the glass and a lower bed. Although a variable resistance is provided in an attempt to vary the sensitivity of the SCR to various illumination levels, the nature of the light sensitive SCR does not permit extremely wide variations.

SUMMARY OF THE INVENTION

In accordance with the teachings of the present invention, an improved exposure indicator is provided for coaction with conventional plate or film making equipment. The present exposure indicator is capable of operating over very wide variations in illumination levels and does not have to be mounted for alignment with, or actuation by, a moving contact glass. In fact, operation of the present indicator is totally independent of the use of a cover glass for the plate making equipment.

More significantly, the indicator of the present invention employs a single light emitting diode that functions as both the light sensor and the light emitter or indicator, thereby eliminating the need for, and cost of, two separate components.

Essentially, then, the present invention provides an exposure indicator, comprising: comparator means for developing an output signal when a first input thereto exceeds a predetermined value; a light emitting diode responsive to illumination for developing a reverse current flow to provide said first input signal and biased by said output signal to cause emission of radiation therefrom; and said output signal providing feedback to said first input to maintain the light emitting diode in a forward biased, light emitting state.

The indicator of the present invention may be supported by or mounted on the plate maker in alignment with the illumination source thereof. A suitable vacuum operated switch is used to place the indicator in readiness for operation whenever the vacuum pump of the plate maker is actuated.

Other characterizing features and advantages of the present invention will become readily apparent from the ensuing detailed description thereof.

BRIEF DESCRIPTION OF THE DRAWINGS

For a fuller understanding of the present invention reference should now be made to the following detailed description thereof taken in conjunction with the accompanying drawings, wherein.

DETAILED DESCRIPTION OF THE PREFERRED EMBODIMENT

Figure 1:
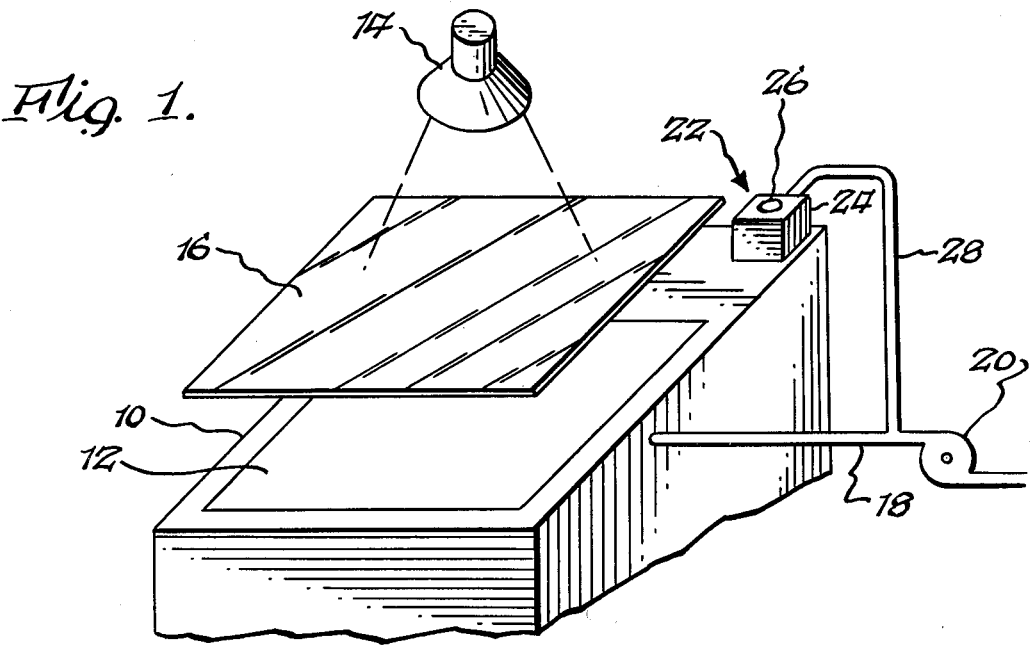
FIG. 1 is a fragmentary perspective view depicting, in schematic fashion, the operative relationship between the exposure indicator and a typical plate making apparatus.

Referring in detail to the drawings, the plate making apparatus is shown in FIG. 1 as including a substantially rectangular cross-sectioned base member or bed 10. The upper surface of member 10 supports a flexible "blanket" 12 upon which the unexposed film is placed for subsequent exposure, upon actuation of a light source 14. A contact or cover glass 16 may be provided above blanket 12 to sandwich the film in place therebetween. Intimate contact between the film, blanket 12 and cover glass 16 (if used) is assured by the vacuum in conduit 18 leading to the blanket from a vacuum pump 20.

Since the constructional details of film or plate making equipment is well know and since the specific details thereof (aside from its general coaction with the exposure indicator) form no part of the present invention, no further details thereof are deemed necessary or required. It should also be understood that the exposure indicator of the present invention may be used in conjunction with process cameras as well. Thus, as used herein and in the appended claims, the term "plate maker" should be interpreted as including all types of equipment for exposing plates and films.

The exposure indicator, generally depicted at 22, includes a housing or casing 24 which may rest or be mounted upon the perimeter of bed 10 such that the single light sensitive and light emitting diode 26 thereof intercepts radiation from light source 14.

Figure 2:
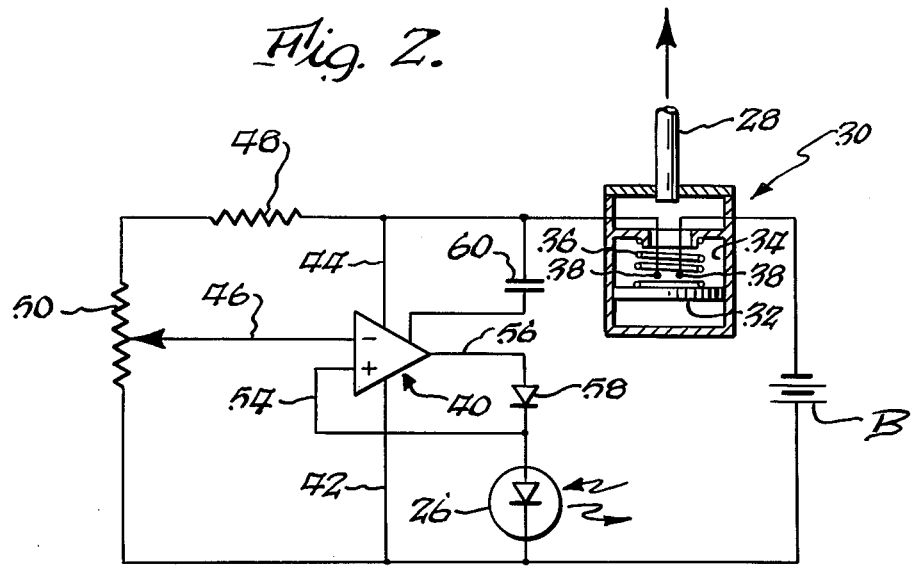
FIG. 2 is a circuit diagram of the exposure indicator of FIG. 1.

As best seen in FIG. 2, a branch line 28 from conduit 18 provides a vacuum for operation of a power switch 30 to place the indicator circuit in readiness for operation whenever vacuum pump 20 is actuated. More specifically, switch 30 may include a piston contact member 32 slidable in a chamber 34 and normally biased by spring 36 out of engagement with circuit closing contacts 38. Alternatively, a diaphragm-type switch may be employed. A suitable direct current electrical source B is provided to power comparator means 40 via lines 42 and 44, which means may comprise a suitable operational amplifier configured as a comparator. The inverting input 46 of comparator means 40 receives a reference voltage signal determined by the values of resistor 48 and variable resistance or potentiometer 50, whereas the control input 52 of which is connected via line 54 to the anode of the light emitting diode 26. Line 54 also serves as a feedback to the control input, as will become apparent hereinbelow.

The arrangement is such that, with vacuum switch 30 closed, illumination from light source 14 impinging on the light emitting diode 26 causes the same to develop a reverse current flow in line 54 creating a signal at the control input of comparator means 40 that is directly proportional to the logarithm of the illumination intensity. This signal is blocked from the comparator output by means of a suitable diode 58 and when the same exceeds the reference signal at the inverting input, an output signal is developed in line 56 which is fed to diode 26 to forwardly bias the same into its light emitting state. The output signal is also fed back via line 54 to the control input of comparator means 40 to maintain this input higher than the inverting input thereof whereby diode 26 is maintained in its forward biased, light emitting state. Thus, once diode 26 is triggered into light emission, such emission continues for as long as vacuum pump 20 is operative to maintain switch 30 closed. An accurate and reliable signal from diode 26 alerts the operator that an exposure has already taken place thereby avoiding timeconsuming and costly double exposures. A suitable capacitor 60 is provided between the power supply and the strobe input of the operational amplifier 40 to insure power-up in the "off" state and prevent false triggering from electrical transients.

It should be clear that since the reverse current signal from light emitting diode 26 (when the same functions as a light detector) is a logarithmic function of the illumination intensity, a very wide value of reference voltages can be set to thereby substantially increase the sensitivity range of operation of the present indicator over that of conventional SCR/LED indicators.

Illustrative circuit components may be as follows:
1. Power source B—6.0 volt battery;
2. Comparator means 40—a CA3130S operational amplifier;
3. Light emitting diode 26—Stanley Electric ESBR 5507;
4. Diode 58—1N914;
5. Resistor 48—22,000 ohms;
6. Potentiometer 50—10,000 ohms; and
7. Capacitor 60—10 microfarads.

It should be understood that the foregoing components and values are illustrative of but one operative embodiment of the indicator circuit of the present invention and that changes in values and components will be readily suggestive to those skilled in the art. It is, therefore, intended that the present invention is to be limited only by the scope of the appended claims.

What is claimed is:

1. In photographic plate makers of the type having a bed for supporting unexposed films or plates; a source of illumination for exposing said films or plates; the improvement of indicator means supported on said bed for signaling that an exposure has taken place, comprising:
   comparator means for developing an output signal when a first input thereto exceeds a predetermined value;
   a light emitting diode responsive to illumination from said source for developing a reverse current flow to provide said first signal and forward biased by said output signal to cause emission of radiation therefrom; and
   said output signal providing feedback to said first input to maintain the light emitting diode in a forward biased, light emitting state.

2. The improvement according to claim 1, wherein:
   said comparator means comprises an operational amplifier.

3. The improvement according to claim 1, wherein:
   a source of vacuum leading to said plate maker; and
   switch means for applying power to said indicator means and actuable to a closed position by said source of vacuum.

4. An exposure indicator for photographic plate makers or the like, comprising:
   comparator means for developing an output signal when a first input thereto exceeds a predetermined value;
   a light emitting diode responsive to illuminating for developing a reverse current flow to provide said first input signal and forward biased by said output signal to cause emission of radiation therefrom; and
   said output signal providing feedback to said first input to maintain the light emitting diode in a forward biased, light emitting state.

5. The indicator according to claim 4, wherein:
   said comparator means comprises an operational amplifier.

6. The indicator according to claim 4, further comprising:
   vacuum operated switch means for supplying power to said indicator.

* * * * *